(12) United States Patent
Martinez

(10) Patent No.: US 7,996,534 B2
(45) Date of Patent: Aug. 9, 2011

(54) FILE DISTRIBUTION IN WIRELESS NETWORKS

(75) Inventor: John V. Martinez, Roswell, GA (US)

(73) Assignee: Axiometric, LLC, Columbia, MD (US)

( * ) Notice: Subject to any disclaimer, the term of this patent is extended or adjusted under 35 U.S.C. 154(b) by 166 days.

(21) Appl. No.: 12/576,227

(22) Filed: Oct. 8, 2009

(65) Prior Publication Data

US 2010/0094923 A1     Apr. 15, 2010

Related U.S. Application Data

(60) Provisional application No. 61/104,032, filed on Oct. 9, 2008.

(51) Int. Cl.
*G06F 15/173* (2006.01)

(52) U.S. Cl. ........ 709/226; 709/201; 709/217; 709/218; 709/219; 709/223; 709/225; 709/229

(58) Field of Classification Search ................... 709/203, 709/217, 218, 219, 223, 225, 226, 229
See application file for complete search history.

(56) References Cited

U.S. PATENT DOCUMENTS

| | | | | |
|---|---|---|---|---|
| 4,785,398 A | * | 11/1988 | Joyce et al. | 711/3 |
| 6,141,728 A | * | 10/2000 | Simionescu et al. | 711/113 |
| 2007/0208764 A1 | * | 9/2007 | Grisinger | 707/100 |
| 2007/0217588 A1 | * | 9/2007 | Bitterlich | 379/201.03 |
| 2007/0250551 A1 | * | 10/2007 | Lango et al. | 707/205 |
| 2009/0063570 A1 | * | 3/2009 | Nichols et al. | 707/200 |
| 2009/0177792 A1 | * | 7/2009 | Guo et al. | 709/231 |
| 2009/0327368 A1 | * | 12/2009 | Aston et al. | 707/205 |
| 2009/0327505 A1 | * | 12/2009 | Rao et al. | 709/230 |

* cited by examiner

*Primary Examiner* — Liangche A. Wang
(74) *Attorney, Agent, or Firm* — Rahman LLC

(57) ABSTRACT

File distribution in wireless mesh networks of devices interconnected in the wireless communications network including a gateway device and a remote device. The gateway device may include gateway storage unit with enumerated storage blocks, together forming the file, a transmitter transmitting the enumerated storage blocks from the storage unit. The remote device may include a storage unit with allocated storage block divided into enumerated storage blocks, a first bitmap mapped to the enumerated storage blocks, a receiver receiving an enumerated block and a processing unit for correlating the received enumerated block to a correlated enumerated storage block and correlating an enumerated storage block with a correlated stored bit in the first bitmap, setting the correlated stored bit in the first bitmap, storing the received enumerated block, building a list of missing blocks, and adding to a missing blocks list, and a transmitter transmitting the missing blocks list.

24 Claims, 13 Drawing Sheets

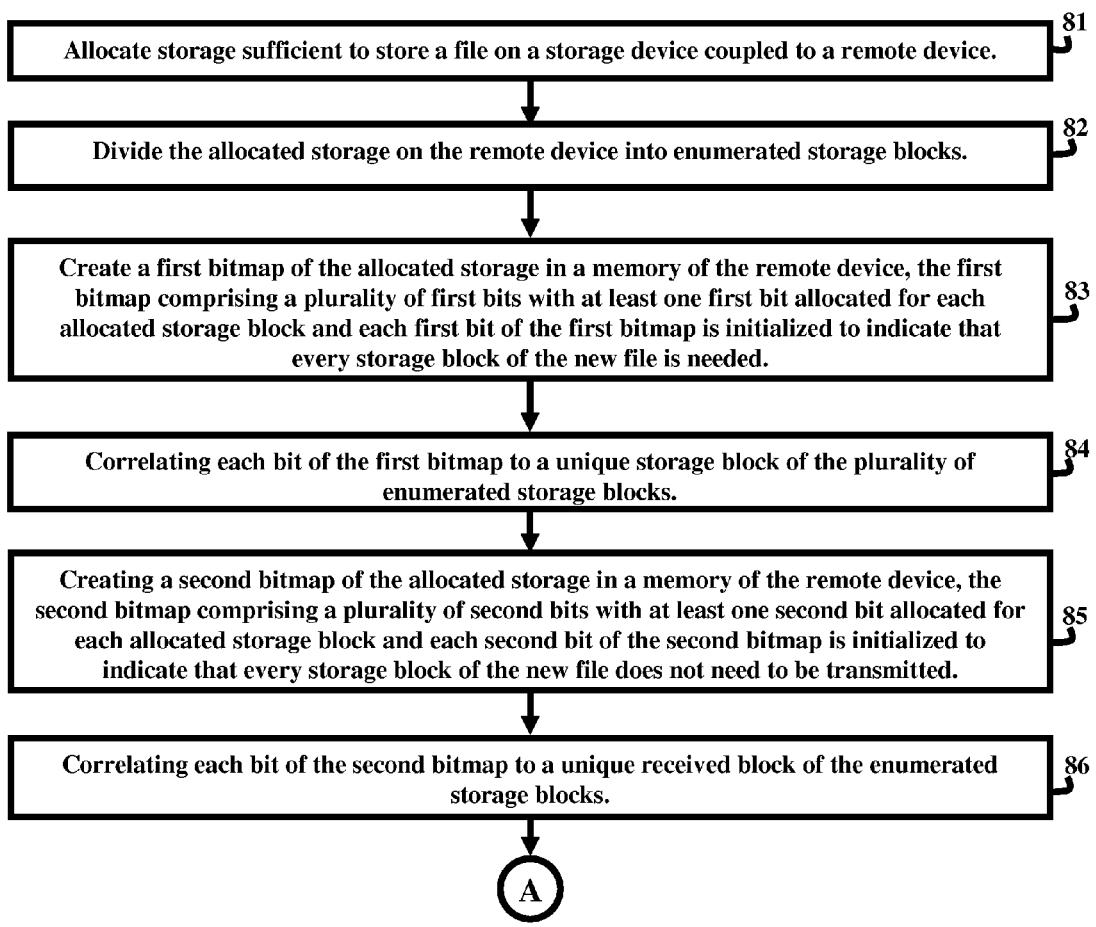

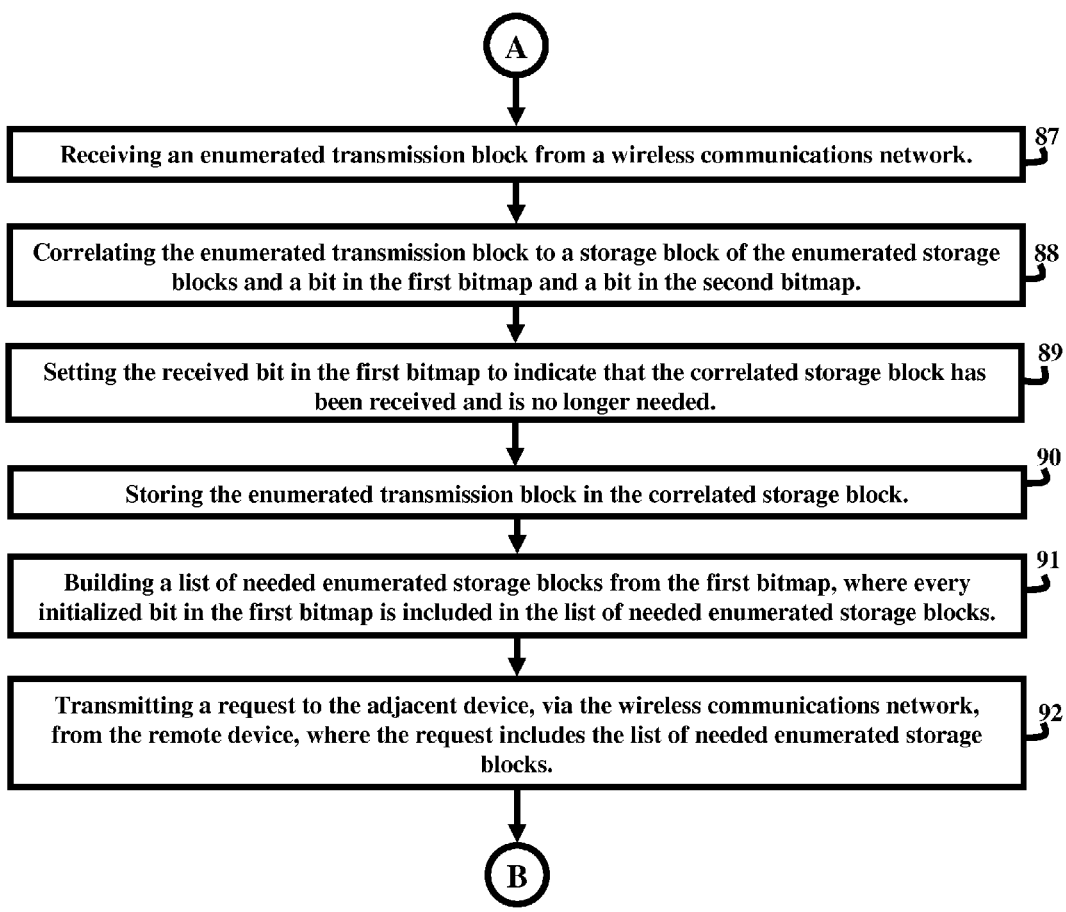

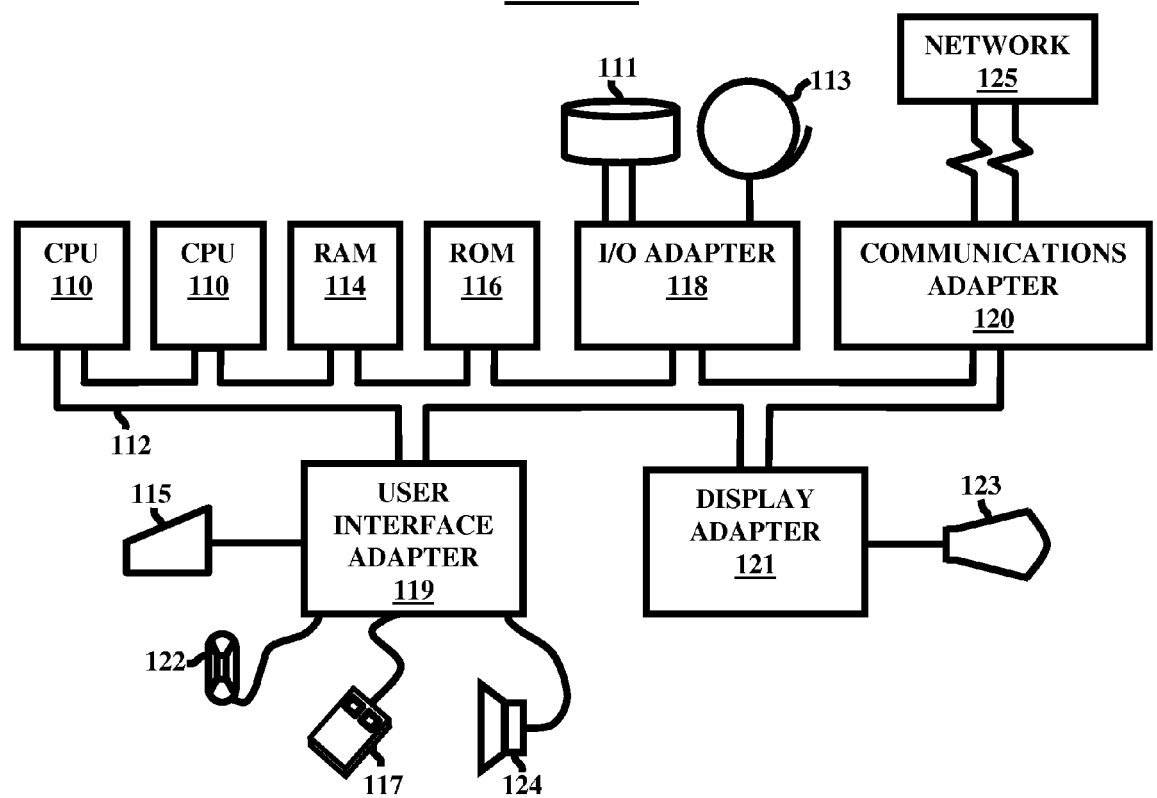

FILE DISTRIBUTION IN WIRELESS NETWORKS

CROSS-REFERENCE TO RELATED APPLICATION

This application claims priority to U.S. Provisional Patent Application Ser. No. 61/104,032, filed on Oct. 9, 2008, the complete disclosure of which, in its entirety, is herein incorporated by reference.

BACKGROUND

1. Technical Field

The embodiments described herein generally relate to the field of wireless communication, and, more particularly, to distribution of files within wireless mesh networks.

2. Description of the Related Art

Contemporary wireless communication networks (hereinafter "networks") typically allow simultaneous communication between several independently operating wireless devices. In order to provide simultaneous communication, each device on the network must not interfere with the transmissions of another device. Moreover, devices must ensure that sending and receiving messages are properly tuned and synchronized with respect to each other. Devices capable of interfering with each other's transmissions are referred to as adjacent devices.

In order for transmissions to be properly sent and received, it is important that adjacent devices do not transmit data over the same communication channel at the same time, an event referred to as a collision. Interference typically results when at least two adjacent devices transmit data over the same communication channel at the same time, making it difficult for intended recipients of the transmissions to disentangle originally transmitted data.

A common approach used in radio frequency (hereinafter "RF") communication to ensure adjacent devices do not transmit over the same communication channel at the same time is to divide the available RF spectrum into fixed quanta called "frequency channels", divide time into fixed quanta called "timeslots" which are aggregated into fixed groups called "frames", and allow transmitters to send data using different frequency channels or different timeslots. An example of this type of communication is frequency hopping spread spectrum communication.

In a wireless network where both the RF spectrum and time are divided up, each separate combination of a particular "frequency channel" and a particular "timeslot" constitutes a unique "communication mode" that does not interfere with other communication modes in the network. Where the available RF spectrum is divided into many frequency channels and time is divided into many timeslots, each device in the network has a large number of non-interfering communication modes that it can use to communicate, thus making it possible for a large number of devices to participate in the network without interference. In addition, since the transmissions of two devices can only cause interference if the two devices are within RF range of one another, the likelihood of interference between devices can be further reduced by manipulating the spacing of the devices and the power level of the transmissions within a network.

FIG. 1 illustrates a wireless communication network including a plurality of wireless devices "A" through "R". Devices that are within RF range of each other (hereinafter referred to as "adjacent devices") have a line drawn between them. For example, devices "A", "B", and "C" are within RF range of each other. Hence, in order to ensure that transmissions involving devices "A", "B", or "C" are properly sent and received, adjacent devices may not transmit on the same frequency channel during the same timeslot. In addition, in order for device "A" to successfully transmit data to devices "B" and "C" using a particular frequency channel and a particular timeslot, devices "B" and "C" must tune into the particular frequency channel during the particular timeslot in order to receive the message.

FIG. 2 illustrates an exemplary set of communication modes for a wireless network configuration. In FIG. 2, time is divided into sequential frames comprising 24 timeslots each, and the available RF spectrum is divided into fifty frequency channels. The beginning of a frame will be referred to as a "frame time" or a "synchronized time reference". Each box in the grid shown in FIG. 2 represents one communication mode. For a particular frame of time, the number of available communication modes is the number of timeslots multiplied by the number of frequency channels, or in this case, 50*24=1200 modes.

Although dividing time and available RF bandwidth helps limit the amount of interference in a wireless network, it creates a complication for the devices of figuring out which frequency channels and timeslots the other devices are using. In order for a communication to succeed, a device transmitting data and a device receiving the transmitted data must both use the same timeslot and frequency channel. Since wireless networks often involve a large number of frequency channels and timeslots, the likelihood that a particular pair of devices will use the same frequency channel/timeslot combination by chance alone is very slim. As a result, it is useful for devices to coordinate their communications in some structured way. For example: networks that use timeslot assignment require mechanisms to synchronize the timing of adjacent transmitters and receivers to ensure successful communication.

In order to coordinate communications between adjacent devices, each device must be aware of the devices adjacent to it; i.e., the device's "adjacencies." In some wireless networks, pre-planning may allow devices to be informed a priori of adjacent devices; however, in wireless networks where devices are added or removed dynamically, manual intervention or an automatic mechanism for discovering adjacent devices may be necessary. Automatic discovery of adjacent devices typically includes a bi-directional exchange of information between the adjacent devices that facilitates future coordinated communications.

In relatively small networks, communication of information between adjacent devices (e.g., devices A and B in FIG. 1) may be sufficient; however, in large networks, source and destination devices are often not adjacent and the information must traverse numerous intermediate devices to reach its final destination (e.g., information sent from device A to device P in FIG. 1 must traverse numerous other devices). The process of moving information across multiple devices towards a final destination is referred to as "routing".

Exemplary approaches used for routing include a priori planning (i.e., static routing), which is used when all device adjacencies within a network are fixed and known in advance, and various metric based approaches (i.e., dynamic routing), which is used in networks where device adjacencies change dynamically. The routing approach used in a particular network is generally chosen to suit the network's structure and the application performed by the network. For example, networks such as monitoring or control networks, where most information flows to or from a central point tend to use different routing approaches than networks such as peer-to-peer networks, where information flows between any two arbitrary devices.

Common properties used to characterize the performance of a routing method within a network include the method's ability to respond to dynamic changes in the network, its speed of delivery of information, the method's reliability of delivery, efficient use of network bandwidth, and efficient use of device resources (e.g., memory).

The quality of a communication link between two devices in a network may vary considerably in quality and may change abruptly. For example, a link that normally works well may become unreliable when an obstruction such as a large truck is introduced between the two devices forming the link. Moreover the quality of communication between an information source and destination separated by intermediate communication links varies with the quality of each intermediate communication link.

Certain routing methods are more reliable than others in the face of unreliable or rapidly changing intermediate links. Reliable routing methods are generally capable of quickly adapting to changing link quality and often send information along multiple simultaneous paths in order to increase the chances for proper delivery. Methods that send information along multiple simultaneous paths trade some network bandwidth and resource efficiency for increased reliability.

Network applications may attempt to compensate for lost network bandwidth and resource efficiency through efficient encoding of information. For example, the network applications may compress the information, or they may attempt to minimize the amount of overhead information sent.

For large RF monitoring and control networks, at least the above issues must be coordinated and balanced to yield a system that is reliable, efficient, and easy to maintain.

Many networks maintain a map of paths stored in the bridging device that must be updated as the quality and presence of network paths change. A central controller in the bridging device specifies an optimal path for data to traverse from each wireless device to the central controller. In networks with dynamically changing links and relatively long communication latencies, maintaining centralized path maps makes it both difficult and slow to respond to changes in the network, particularly when dealing with compromised links and large topologies.

SUMMARY

In view of the foregoing, an embodiment herein provides a system of distributing a file through a wireless connection network comprising a plurality of devices interconnected in the wireless communications network, the plurality of devices comprising: at least one gateway device comprising: a gateway storage unit comprising a plurality of enumerated storage blocks that together form the file; and a gateway transmitter operatively connected to the wireless communications network, and transmitting the enumerated storage blocks from the gateway storage unit; and at least one remote device comprising: a remote device storage unit comprising: an allocated storage block sufficiently sized to store the file; a plurality of enumerated storage blocks that together form the allocated storage block; and a first bitmap comprising a plurality of stored bits, where every stored bit in the first bitmap is initially reset and is correlated to a unique enumerated storage block in the plurality of enumerated storage blocks; a remote device receiver operatively connected to the wireless communications network, and receiving an enumerated block; a remote device processing unit comprising: a correlating unit correlating the received enumerated block to a correlated enumerated storage block in the plurality of enumerated storage blocks and correlating an enumerated storage block with a correlated stored bit in the first bitmap; a map management unit setting the correlated stored bit in the first bitmap; a storing unit storing the received enumerated block to the correlated enumerated storage block; a list building unit building a list of missing blocks, and adding enumerated missing block identifiers to the list of missing blocks for correlated reset stored bits in the first bitmap; and a remote device transmitter operatively connected to the wireless communications network, and transmitting the list of missing blocks.

In such a system, the gateway storage unit may comprise a second bitmap comprising a plurality of transmit bits, where every transmit bit in the second bitmap is initially reset and correlated to a unique enumerated storage block in the enumerated storage blocks, and the gateway device further comprises: a gateway receiver receiving a list of missing blocks from the remote device, where the list comprises identifiers for one or more enumerated blocks; a gateway processing unit comprising: a gateway correlating unit correlating the missing block identifiers to correlated enumerated storage blocks in the plurality of enumerated storage blocks and correlated transmit bits in the second bitmap; and a gateway map management unit setting the correlated transmit bits in the second bitmap, where the gateway device transmits, via the gateway transmitter, an enumerated storage block and enumerated storage block identifier for every correlated transmit bit set in the second bitmap. In addition, the gateway receiver may receive an enumerated block and enumerated block identifier and the gateway correlating unit correlates the received enumerated block identifier to the correlated transmit bit in the second bitmap; and where the gateway map management unit resets the correlated transmit bit in the second bitmap. Moreover, the gateway device selects and transmits enumerated storage blocks sequentially for every correlated transmit bit set in the second bitmap.

Furthermore, the remote device storage unit may comprise a second bitmap comprising a plurality of transmit bits, where every transmit bit in the second bitmap is initially reset and correlated to a unique enumerated storage block in the plurality of enumerated storage blocks, where the a remote device receiver receives a request comprising a list of one or more missing block identifiers, where the remote device correlating unit correlates the requested missing block identifiers to a correlated enumerated storage block in the plurality of enumerated storage blocks and a correlated stored bit in the first bitmap and a correlated transmit bit in the second bitmap, where the map management unit sets the transmit bit in the second bitmap if the correlated stored bit in the first bitmap is set, and where the remote device transmits, via the remote device transmitter, a correlated enumerated storage block and enumerated storage block identifier for every transmit bit set in the second bitmap. In addition, the remote device enters a relay mode when the remote device receiver receives a request comprising one or more missing enumerated block identifiers, and the requested enumerated block identifiers are correlated to the stored bits in the first bitmap; and when one or more stored bits in the first bitmap are reset.

Moreover, such a system may further comprise a new remote device comprising: a new remote device storage unit comprising: a new remote device allocated storage block of sufficient size to store the file; a plurality of new remote device enumerated storage blocks that together form the new remote device allocated storage block; and a new remote device first bitmap comprising a plurality of new remote device stored bits, where every new remote device stored bit in the new remote device first bitmap is initially reset and correlated to a unique new remote device first enumerated storage block in the new remote device enumerated storage blocks; a new remote device receiver operatively connected to the wireless communications network, and receiving an enumerated block and enumerated block identifier; a new remote device processing unit comprising: a new remote device correlating unit correlating the received enumerated block identifier to a new remote device correlated enumerated storage block in the plurality of new remote device enumerated storage blocks and a new remote device correlated stored bit in the new remote device first bitmap; a new remote device map management unit setting the new remote device correlated stored bit in the new remote device first bitmap; a new remote device storing unit storing the received enumerated block to the new remote device correlated enumerated storage block; a new remote device list building unit building a new remote device list of missing enumerated block identifiers, and adding a new remote device enumerated missing block identifier to the new remote device list of missing block identifiers for every correlated reset stored bit in the new remote device first bitmap; and a new remote device transmitter operatively connected to the wireless communications network, and transmitting the new remote device list of missing block identifiers. In addition, the new remote device storage unit may comprise a new remote device second bitmap comprising a plurality of new remote device transmit bits, and every new remote device transmit bit in the new remote device second bitmap may initially reset and correlated to a unique new remote device enumerated storage block in the new remote device enumerated storage blocks, where the new remote device receiver may receive a request comprising a list of one or more requested missing block identifiers, where the new remote device correlating unit may correlate each requested enumerated block identifier in the requested list of enumerated block identifiers to a new remote device correlated enumerated storage block in the plurality of new remote device enumerated storage blocks and a correlated stored bit in the new remote device first bitmap and a correlated transmit bit in the new remote device second bitmap, where the new remote device map management unit may set the correlated transmit bit in the new remote device second bitmap if the correlated stored bit is also set in the new device first bitmap, and where the new remote device may transmit, via the new remote device transmitter, an enumerated storage block for every correlated transmit bit set in the new remote device second bitmap.

Additionally, the new remote device may select and transmit enumerated storage blocks randomly from the set of correlated transmit bits in the new remote device second bitmap that are set. Furthermore, the new remote device may enter a relay mode when the received enumerated block identifier request is correlated to a stored bit in the new device first bitmap and at least one bit of the new device first bitmap is reset. In addition, when the new remote device is in relay mode and when the new device receiver receives an enumerated block and the correlated stored bit in the new remote device first bitmap is reset, the new remote devices may store the received enumerated block in the correlated enumerated storage block in the plurality of enumerated storage blocks; and the new remote device may set the correlated stored bit in the new remote device first bitmap; and the new remote device sets the correlated transmit bit in the new remote device second bitmap.

The new remote device receiver receives an enumerated block and enumerated block identifier and the new remote device correlating unit correlates the received enumerated block identifier to the correlated stored bit in the first bitmap; wherein the new remote device correlating unit correlates the received enumerated block identifier to the correlated transmit bit in the second bitmap, and wherein if the correlated stored bit in the first bitmap is already set, the new remote device map management unit resets the correlated transmit bit in the second bitmap.

Another embodiment provides an apparatus storing a file distributed across a wireless communications network connecting a plurality of adjacent devices, the apparatus comprising: a receiver operatively connected to the wireless communications network, and receiving an enumerated storage block and a request from an adjacent device, wherein the request comprises a requested block; a storage unit comprising: an allocated storage block sufficient sized to store the file; a plurality of enumerated storage blocks that together form the allocated storage block; a first bitmap comprising a plurality of stored bits, wherein every stored bit in the first bitmap is initially reset and is correlated to a unique enumerated storage block in the plurality of enumerated storage blocks; and a second bitmap comprising a plurality of transmit bits, wherein every transmit bit in the second bitmap is initially reset and correlated to a unique enumerated storage block in the plurality of enumerated storage blocks.

The apparatus further comprises a processing unit wherein the processing unit: correlates the received enumerated storage block to a correlated enumerated storage block in the plurality of enumerated storage blocks and a correlated stored bit in the first bitmap, sets the correlated stored bit in the first bitmap, stores the received enumerated storage block to the correlated enumerated storage block, builds a list of missing blocks and adds an enumerated missing block identifier to the list of missing blocks for every reset stored bit in the first bitmap, correlates the requested block to a correlated storage block in the plurality of enumerated storage blocks and a requested block transmit bit in the second bitmap, sets the requested block transmit bit in the second bitmap; and selects an enumerated requested block from the second bitmap. The apparatus further comprises a transmitter operatively connected to the wireless communications network, and transmitting the list of missing blocks and the enumerated requested block.

The processing unit correlates the received enumerated block to a correlated enumerated block transmit bit in the second bitmap; correlates the received enumerated block to a correlated enumerated block stored bit in the first bitmap; and resets the correlated enumerated block transmit bit in the second bitmap when the correlated enumerated block stored bit in the first bitmap is set prior to reception of the enumerated block. Additionally, the processing unit builds a list of uni-directional adjacent device identifiers, wherein an adjacent device comprises a device which the apparatus directly communicates with via wireless communication without the communication being relayed by other devices; and wherein the processing unit determines whether an adjacent device is operatively connected to the wireless communications network via a uni-directional communications link; and adds a uni-directional adjacent device identifier to the list of uni-directional adjacent devices when determined the adjacent device is operatively connected to the wireless communications network via the uni-directional communications link.

Furthermore, wherein the processing unit determines whether the requested block is received from a requesting uni-directional adjacent device identified in the list of uni-directional adjacent device identifiers; and does not set the requested block transmit bit in the second bitmap when determining the requested block is received from a requesting uni-directional adjacent device identified in the list of uni-directional adjacent device identifiers. The processing unit randomly selects one or more random missing enumerated blocks to request from the adjacent devices from the group of stored bits in the first bitmap that are reset, wherein the processing unit builds a list of the missing enumerated block identifiers, and wherein the transmitter transmits the list of missing enumerated block identifiers.

Also, the processing unit randomly selects a correlated enumerated storage block to transmit to the adjacent devices from among the group of correlated transmit bits in the second bitmap, and wherein the transmitter transmits the random enumerated storage block. Moreover, the received request comprises a priority value, and wherein the processing unit assigns the priority value to each requested block in the list of requested blocks according to the received priority value. Furthermore, the transmitter transmits each requested block in the list of requested blocks sequentially in order of the assigned priority value.

Additionally, the processing unit builds a list of bi-directional adjacent device identifiers; determines whether an adjacent device is operatively connected to the wireless communications network via a bi-directional communications link; and adds a bi-directional adjacent device identifier to the list of bi-directional adjacent device identifiers when determined the adjacent device is operatively connected to the wireless communications network via the bi-directional communications link.

Furthermore, the processing unit determines the requested block is received from a requesting adjacent device and the adjacent device is not identified in the list of bi-directional adjacent device identifiers; and does not set the correlated transmit bit in the second bitmap. Also, the transmitter transmits each enumerated requested block from the second bitmap in the order in which the enumerated block requests were received.

Another embodiment provides a computer-implemented method of distributing a file to a plurality of devices, comprising at least one remote device and at least one adjacent device, through a wireless communications network, the method comprising: allocating storage sufficient to store the file on a storage device coupled to the remote device; dividing the allocated storage on the remote device into enumerated storage blocks; creating a first bitmap of the allocated storage in a memory of the remote device, the first bitmap comprising a plurality of stored bits and each stored bit of the first bitmap is reset; correlating, by the remote device, each stored bit of the first bitmap to a unique storage block of the plurality of enumerated storage blocks; receiving, by the remote device, an enumerated transmission block from the wireless communications network; correlating, by the remote device, the enumerated transmission block to a block of the enumerated storage blocks and a stored bit in the first bitmap; setting, by the remote device, the stored bit in the first bitmap; storing the enumerated transmission block in the enumerated storage block; building a list of needed enumerated storage blocks from the first bitmap, wherein every reset stored bit in the first bitmap is included in the list of needed enumerated storage blocks; transmitting a request to the adjacent device, via the wireless communications network, from the remote device, where the request includes the list of needed enumerated storage blocks; creating a second bitmap of the allocated storage in the memory of the remote device, where the second bitmap comprises a plurality of transmit bits and each transmit bit of the second bitmap is reset; correlating, by the remote device, each transmit bit of the second bitmap to a unique block of the enumerated storage blocks; receiving, by the remote device, a request from the adjacent device for a needed block via the wireless communications network; correlating, by the remote device, the needed block to a block of the enumerated storage blocks and a stored bit in the first bitmap and a transmit bit in the second bitmap; setting, by the remote device, the transmit bit in the second bitmap; determining, by the remote device, needed blocks of the adjacent devices from the set transmit bits in the second bitmap; and transmitting, by the remote device, the determined needed blocks to the adjacent device via the wireless communications network.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 10(A) through 10(C) are flow diagrams illustrating a preferred method according to the embodiments described herein; and FIG. 11 illustrates a schematic diagram of a computer architecture used in accordance with the embodiments described herein.

DETAILED DESCRIPTION OF PREFERRED EMBODIMENTS

Figure 1:
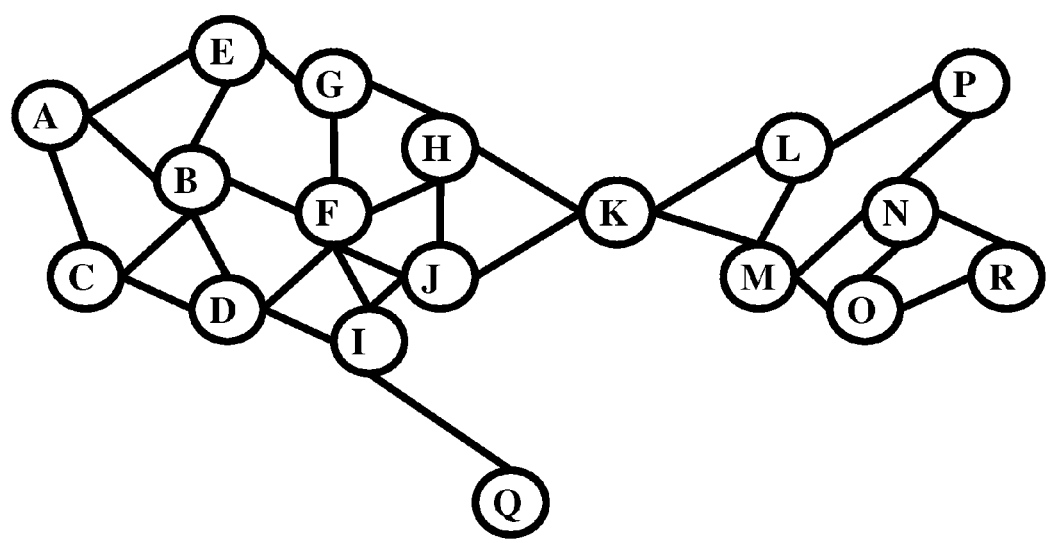
FIG. 1 is a diagram illustrating a structure for a wireless communication network.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments described herein provide a highly efficient method for distribution of files that leverages the characteristics of the wireless mesh network. Files herein refer to collections of data that are generally larger than will fit in an individual wireless transmission. Moreover, embodiments described herein are typically tree-structured networks wherein each device in the network contains a radio transceiver capable of 2-way radio communication with other devices in the network. In a tree-structured network, a single device at the "root" of the network is referred to as a gateway device into which new files are introduced for distribution to remote devices (the "branches" or "leaves") in the network.

Examples of systems containing gateway and remote devices include systems for remote sensor monitoring (telemetry), remote monitoring and control of utility meters, pipelines, traffic control systems, industrial lighting and control systems, irrigation control systems, structural sensors, security systems, home automation systems, etc. Examples of files to be distributed include firmware and other software, schedules of operation, tables of values, digital media such as music or voice messages, advertising images and text, etc.

Moreover, wireless mesh networks often comprise large numbers of remote devices that are often difficult to physically access and whose primary means of external communication is the wireless network. For example, software updates for these remote devices may be required to add new features or correct defects in existing software. In such cases the cost to visit and access each device in order to upgrade the operating software may be excessive. These remote devices typically have no public network (e.g., internet, PSTN, etc.) or other connectivity than the two-way wireless communication links that form the wireless mesh network. Thus, according to the embodiments described herein, the wireless communication links may be used to distribute updated software and other files.

Referring now to the drawings, and more particularly to FIGS. 3 through 11, where similar reference characters denote corresponding features consistently throughout the figures, there are shown preferred embodiments.

Figure 2:
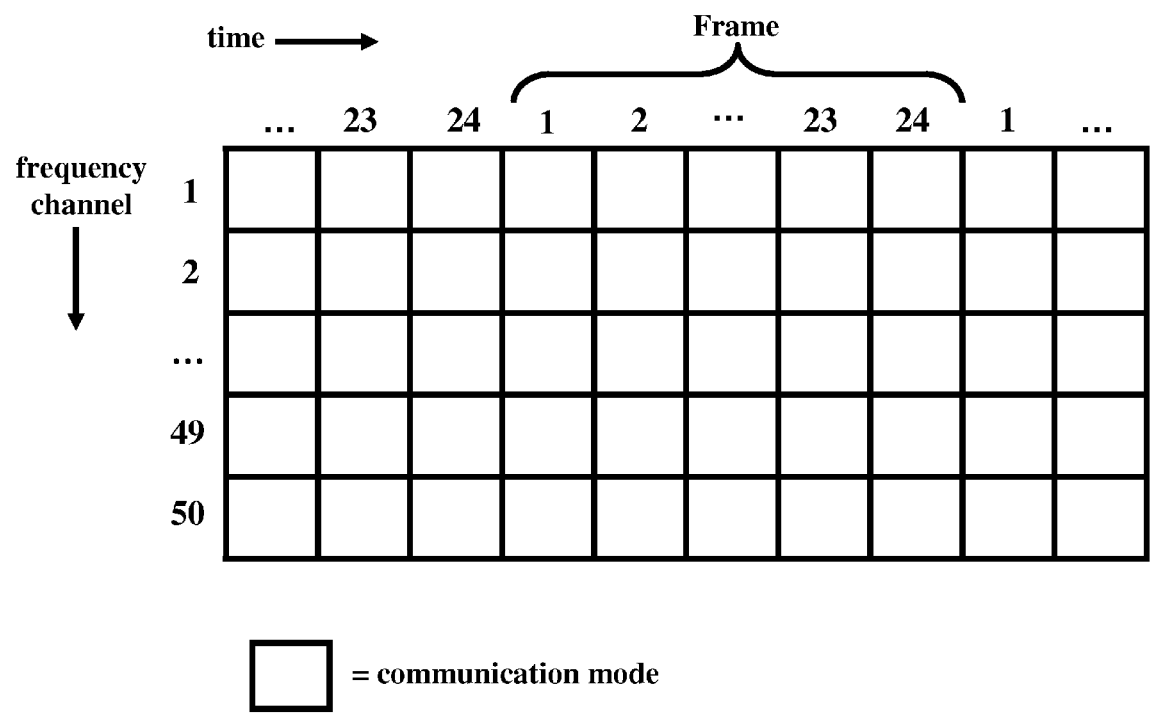
FIG. 2 is a diagram illustrating communication modes for an exemplary configuration of a wireless network.
Figure 3:
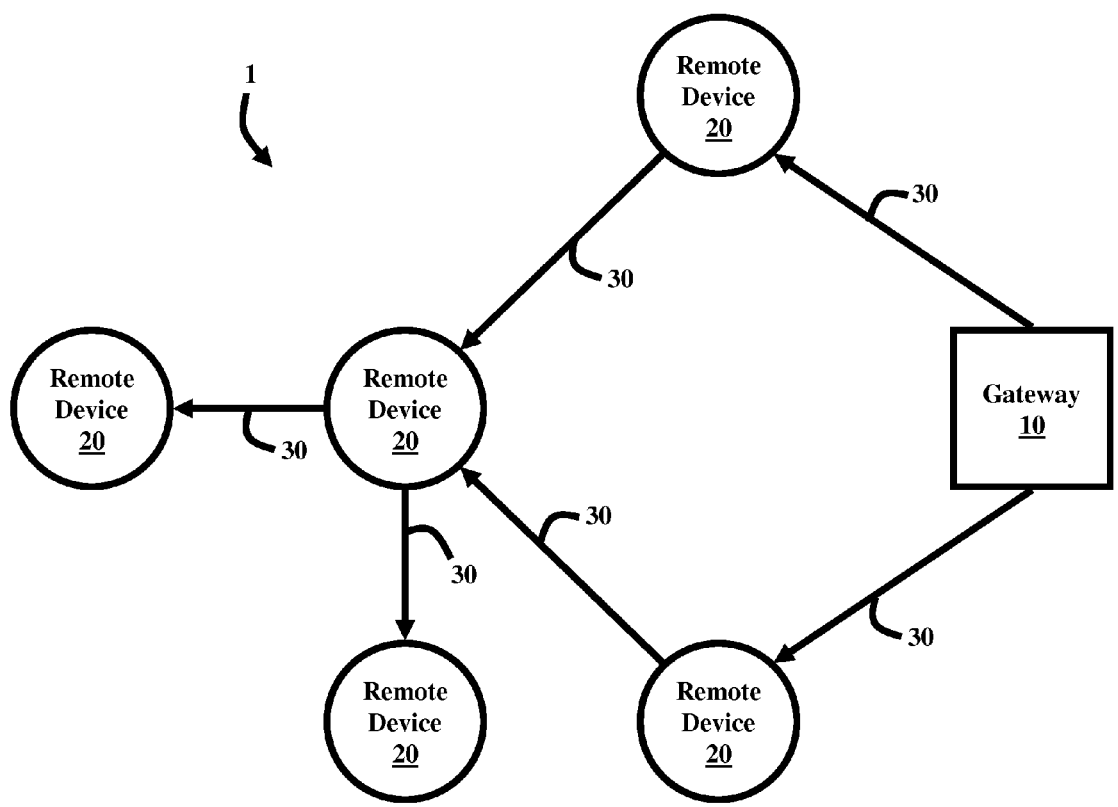
FIG. 3 illustrates a schematic diagram of a wireless communication network according to the embodiments described herein.
Figure 4:
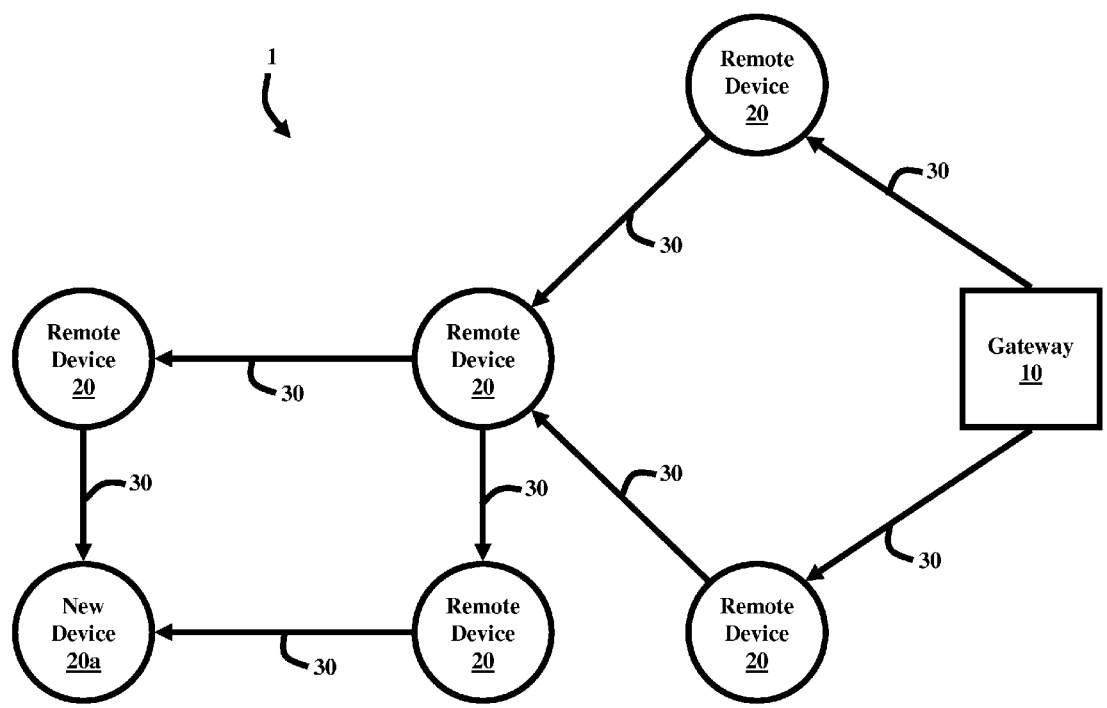
FIG. 4 illustrates a schematic diagram of a new remote device being added to a wireless communication network according to the embodiments described herein.

FIGS. 3 and 4, with reference to FIGS. 1 and 2, are schematic diagrams illustrating devices communicating via a wireless communications network, according to the embodiments described herein. FIG. 3 shows wireless communication network 1 that comprises at least one gateway device 10, a plurality of remote devices 20 and a plurality of wireless communications links 30. As described in further below, gateway device 10 may distribute files to a plurality of remote devices 20 on a plurality of wireless communications links 30. Furthermore, FIG. 4 shows a wireless communication network 1 that comprises at least one gateway device 10, a plurality of remote devices 20, a new device 20a, which has recently joined wireless communications network 1, and a plurality of wireless communications links 30. As described in further detail below, a plurality of remote devices 20 may distribute files to a new remote device 20a using wireless communication links 30. Furthermore, remote devices 20 and new device 20a may include comparable features and may include one or more electric utility meters and/or one or more water utility meters.

Figure 5:
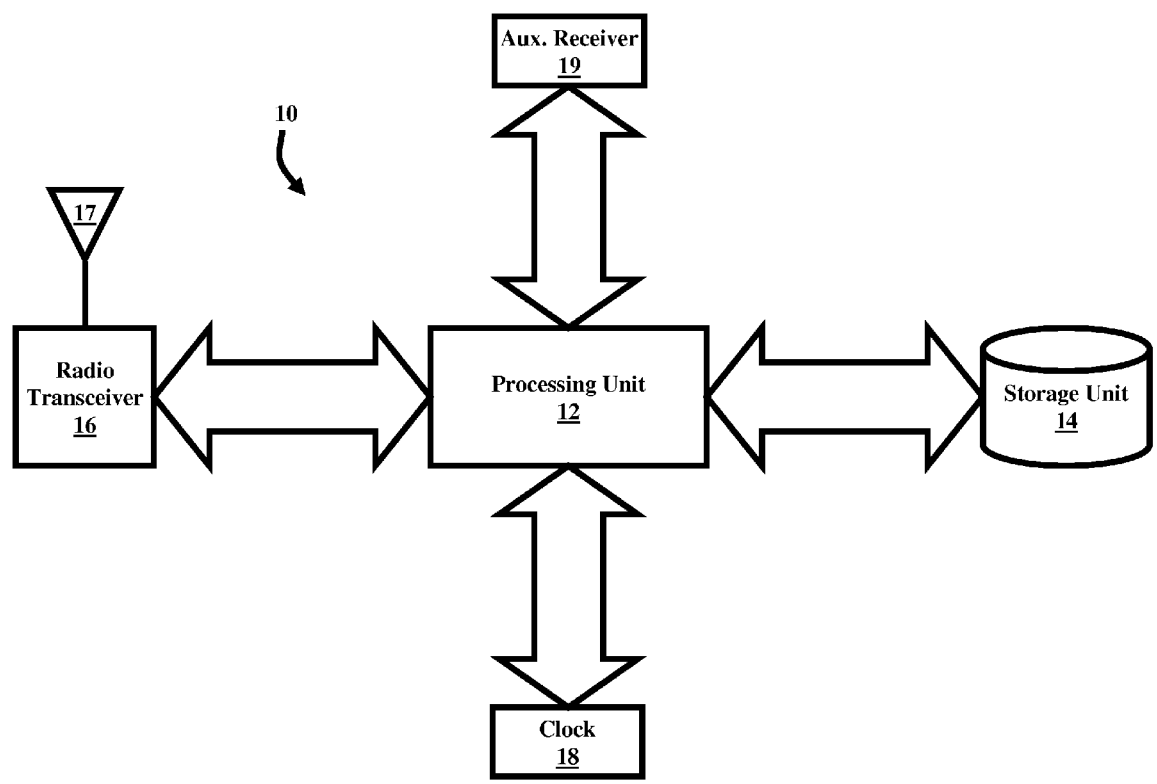
FIG. 5 illustrates a schematic diagram of a gateway device, according to the embodiments described herein.

FIG. 5, with reference to FIGS. 1 through 4, shows a schematic diagram of a gateway device 10 according to the embodiments described herein. According to FIG. 5, gateway device 10 includes microprocessor/controller 12, memory 14, primary radio transceiver 16 (including radio antenna 17), an optional auxiliary communication interface 19 (e.g., Ethernet, Wi-Fi, GPRS, USB, Serial, etc.) and clock (or timer) 18.

Figure 6:
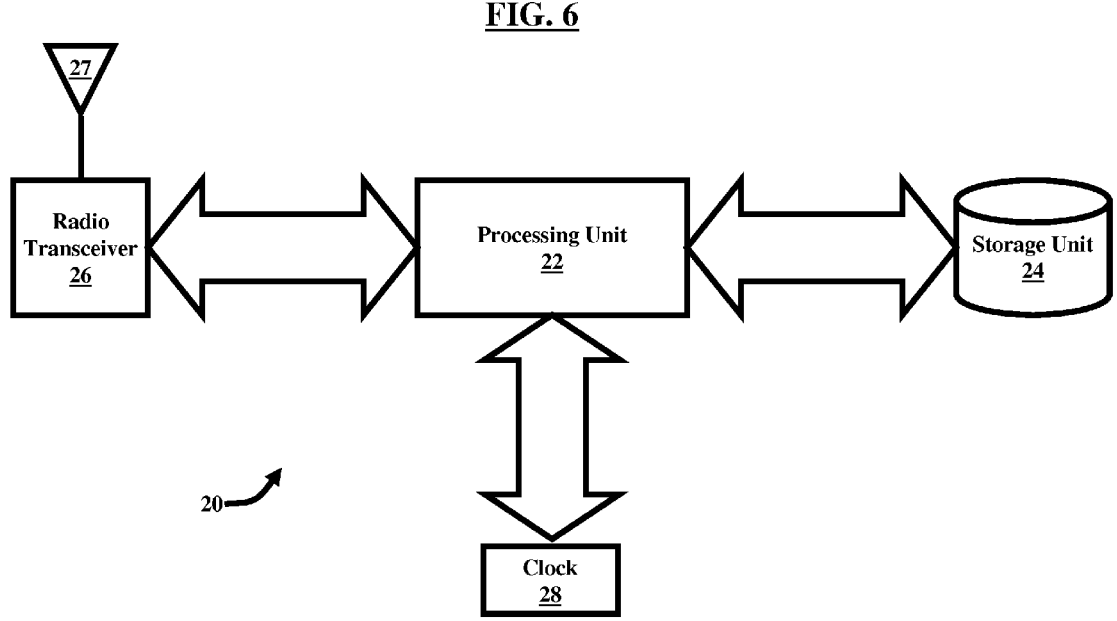
FIG. 6 illustrates a schematic diagram of a remote device according to the embodiments described herein.

FIG. 6, with reference to FIGS. 1 through 5, shows a schematic diagram of a remote device, according to the embodiments described herein. According to FIG. 6 shows remote device 20 includes microprocessor/controller 22, memory 24, radio transceiver 26 (including radio antenna 27), and clock (or timer) 28. Although not shown in FIG. 6, remote device 20 optionally includes a battery or other stored energy source. Moreover, since remote device 20 is often a power-limited device, radio transceiver 26 may operate intermittently to conserve power.

While not shown in FIGS. 1 through 6, gateway device 10 may communicate with external systems using primary radio transceiver 16 or one or more auxiliary communication interfaces 19. Although external systems communicate with gateway device 10, the external systems do not have access to wireless communications network 1. However, external systems may use one of the communication links in gateway device 10 (e.g., radio transceiver 16 or auxiliary communication interface 19) to communicate a new file to gateway device 10 for distribution to the plurality of remote devices 20 through wireless communications network 1, as shown in FIG. 3. Moreover, communication within wireless communication network 1 may be structured such that when one device operatively connected to wireless communications network 1 (e.g., gateway device 10 and remote devices 20, shown in FIGS. 3 and 4) transmits a message using its radio transceiver, many other devices (e.g., gateway device 10 and remote devices 20) are capable of receiving the message. Accordingly, wireless communications network 1 exhibits a one-to-many relationship between a transmitter on one device (e.g., gateway device 10 and remote devices 20) and receivers of a plurality of devices (e.g., gateway device 10 and remote devices 20) that can be leveraged to make file distribution more efficient.

Figure 7:
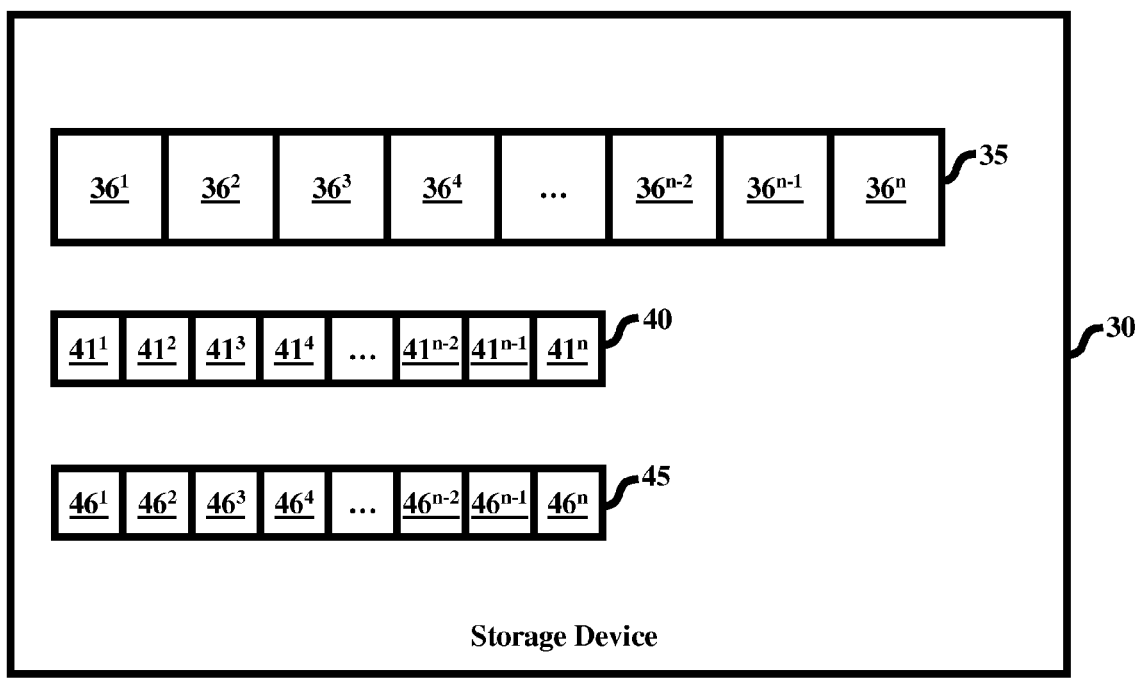
FIG. 7 illustrated a schematic diagram of a storage device according to the embodiments described herein.

FIG. 7 shows a schematic diagram of a storage device 30 according to the embodiments described herein. The structure of storage device 30 allows devices operatively connected in wireless communications network 1 (e.g., gateway device 10 and remote devices 20, shown in FIGS. 3 and 4) to efficiently distribute files. Moreover, storage unit 14 (shown in FIG. 5), and storage unit 24 (shown in FIG. 6) may comprise storage device 30. As shown, storage unit 30 comprises file 35, first bitmap 40, and second bitmap 45. File 35 is further subdivided into a plurality of enumerated blocks 36, where each enumerated block 36 preferably does not overlap. In addition, each enumerated block 36 is sequentially numbered. For example, assuming file 35 has been divided into n blocks, FIG. 7 shows the enumerated blocks 36 are numbered $36^1$, $36^2$, $36^3$, $36^4$ ... $36^{n-2}$, $36^{n-1}$ and $36^n$. Preferably, enumerated blocks 36 1 through n−1 are of equal size, with the $n^{th}$ being the remainder. Furthermore, first bitmap 40 and second bitmap 45 may each comprise n bits, or elements, where each bit (or element) in first bitmap 40 and second bitmap 45 has been correlated to an enumerated block 36. For example, both first bitmap 40 and second bitmap 45 may be correlated so that each respective bit (or element) position in the respective bitmaps has been correlated to the respectively numbered enumerated block 36. Therefore, according to FIG. 7, $41^1$ and $46^1$ is correlated to enumerated block $36^1$, $41^2$ and $46^2$ is correlated to enumerated block $36^2$, $41^3$ and $46^3$ correlated to enumerated block $36^3$, $41^4$ and $46^4$ is correlated to enumerated block $36^4$ and so on. Although the discussion that follows assumes bitmap 40 and bitmap 45 are bitmaps, such a convention is used merely to simplify the discussion. Other configurations are possible and the embodiments described herein are not intended to be limited to bitmaps.

Preferably, each enumerated block 36, as well as first bitmap 40 and second bitmap 45, are initialized (e.g., all bits are reset, to have a value equal to "0"). Thereafter, each enumerated block 36 stores the data corresponding to that block of file 35 and the bits of first bitmap 40 and second bitmap 45 are set, as described in further detail below.

The bits in first bitmap 40 and second bitmap 45 represent enumerated blocks 36 stored in storage unit 30, where each element (or bit) of first bitmap 40 and second bitmap 45 is numbered for reference; e.g., block 1, block 2, block 3 ... block n. As described in further detail below, in first bitmap 40 each element (or bit) of the bitmap represents whether a corresponding enumerated block 36 of file 35 has been received and is stored in the corresponding enumerated block 36 location, or has not been received and corresponding enumerated block 36 location is empty (typically initialized to contain all zero values). Furthermore, in second bitmap 45, each element (or bit) of the bitmap that has been set represents a corresponding enumerated block 36 that is stored in storage unit 30, but not stored (and therefore is needed) by an adjacent device (e.g., remote device 20 or remote device 20a, shown in FIG. 4).

Figure 8:
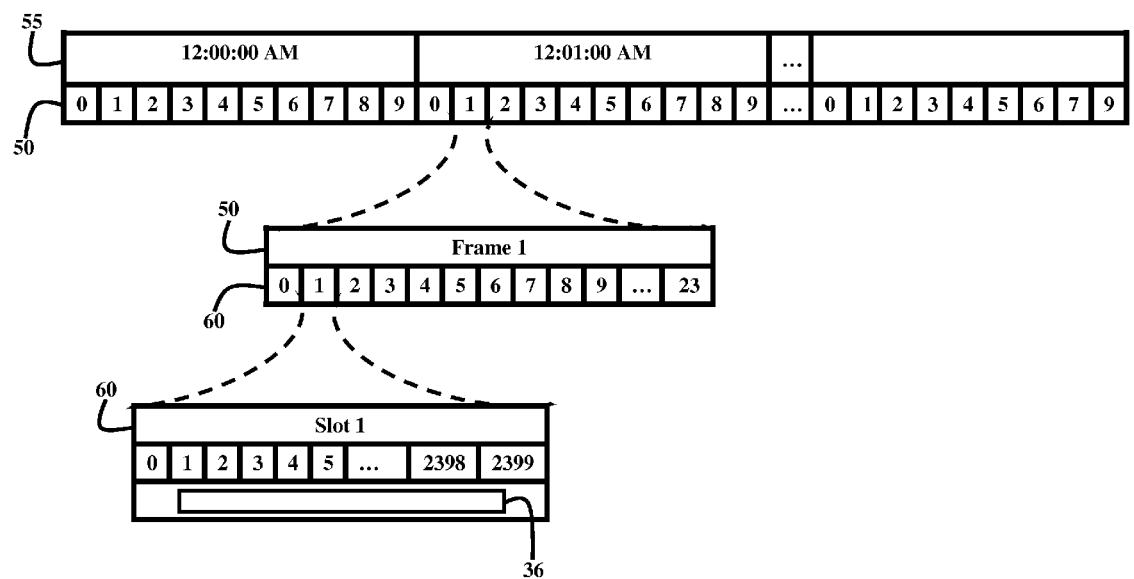
FIG. 8 illustrates a schematic diagram of an exemplary method for dividing communication via Time-Division-Multiple-Access according to the embodiments described herein.

The size of the enumerated blocks is preferably optimized to fit in a single wireless transmission. Optimally fitting a block into a single wireless transmission may depend on the protocol used by wireless communications links 30. For example, wireless communication network 1 may utilize wireless communications links 30 using time division multiple access (TDMA) division to allow a common data transmission medium to be used by devices attached to wireless communications network 1 (e.g., gateway device 10 and remote devices 20, shown in FIGS. 3 and 4). FIG. 8, with reference to FIGS. 1 through 7, shows a schematic diagram of an example of TDMA protocol used in accordance with the embodiments herein. As shown in FIG. 8, the TDMA protocol used by wireless communications link 30 may divide each minute of time into frames 50, where each frame 50 is six seconds. In addition, a group of ten frames 50 constitutes super-frame 55. Thus, as shown in FIG. 8, there are ten frames 50 and one super-frame 55, for every minute of time. In addition, each frame 50 may be divided into 24 slots 60, where each slot 60 is a ¼ second time period. Moreover, each slot 60 in a frame may contain a certain number of binary digits (or "bits", e.g., 0 or 1) that may be transmitted. The number of bits capable of being transmitted in each slot 60 depends on the data transmission rate for wireless communication links 30. For example, when wireless communications link 30 transmits bits at a rate of 9600 bits-per-second (or "bps"), each slot 60 contains 2400 bits and each bit is transmitted in 1/9600 seconds—or approximately 105 micro-seconds. As shown in FIG. 8, each slot 60 may include an enumerated block 36, where the enumerated block is part of the data transmitted via wireless communications link 30. Moreover, enumerated block 36 is contained in a message that is preferably centered within each slot 60 (i.e., with equal amounts of empty bits on either side) to allow maximum time between enumerated blocks 36 transmitted via communication link 30.

Thus, assuming wireless communications link 30 operates as described above in reference to FIG. 8, each timeslot 60 contains 2400 bits of data; if the wireless communications link 30 allows fifty empty bits of padding before and after each wireless message transmission containing block 36 and the wireless message includes 252 bits of communications overhead for each enumerated block transmitted, each enumerated block size would equal 2048 bits (256 bytes).

Figure 9:
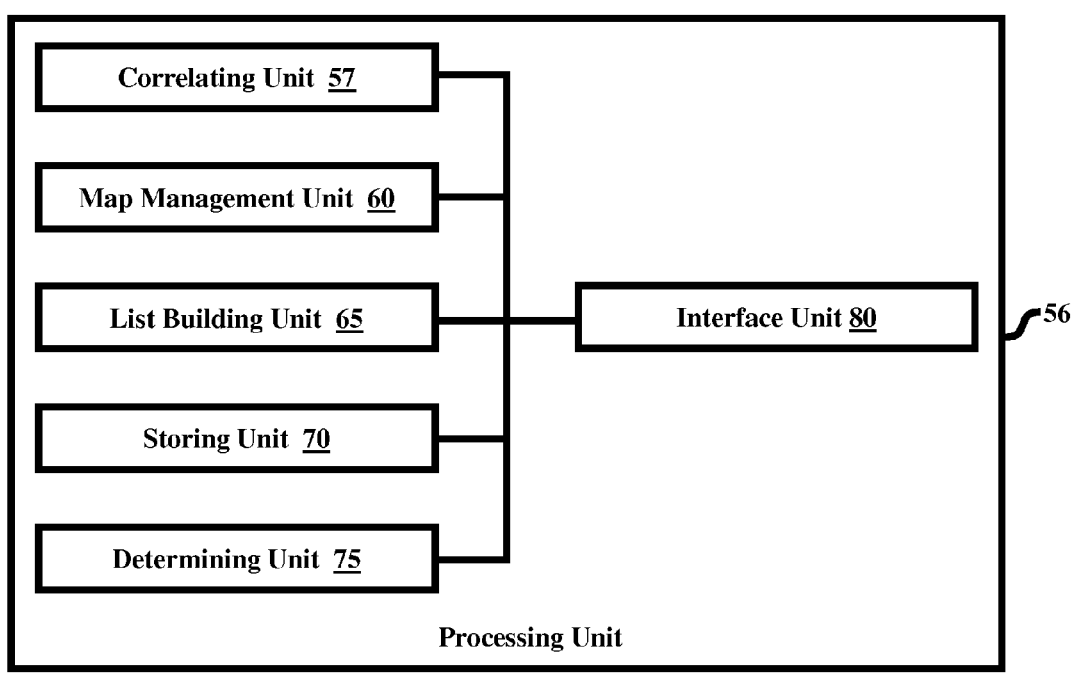
FIG. 9 illustrates a schematic diagram of a processing unit according to the embodiments described herein.

FIG. 9 shows a schematic diagram of a processing unit 56 according to the embodiments described herein. Processing unit 56 manages storage unit 30, among other functions. Moreover, processing unit 12 (shown in FIG. 5) and processing unit 22 (shown in FIG. 6) may comprise processing unit 56. As shown in FIG. 9, the structure of processing unit 56 includes correlating unit 57, map management unit 60, list building unit 65, storing unit 70, determining unit 75, and interface unit 80, where interface unit 80 interfaces with other units operatively connected to processing unit 56. Although the correlating unit 57, map management unit 60, list building unit 65, storing unit 70, determining unit 75, and interface unit 80 are shown as structural components of processing unit 56, each unit may also constitute a logical unit of processing unit 56. Alternatively, each unit may be removed from processing unit 56 and form an application-specific integrated circuit (ASIC). Furthermore, processing unit 56 may be a general purpose processing unit and upon receiving special instructions, processing unit 56 may no longer operate as a general purpose processing unit, but rather operate as one of the specialty units described in FIG. 9, until those special instructions are no longer applied to processing unit 56.

To assist in understanding the operation of processing unit 56, the features of the structural units that comprise processing unit 56 (e.g., correlating unit 57, map management unit 60, list building unit 65, storing unit 70, determining unit 75, and interface unit 80) are described below. These features may be described by instructions to processing unit 56 that conform with an instruction set architecture (ISA) defined for processing unit 56. Since the ISA for processing unit 56 is predefined, the structural requirements of each instruction within the ISA are also predefined. Thus, when the features of processing unit 56 described below are implemented via instructions that comply with the ISA of processing unit 56, the structure of the features described is in accordance with the structure of the instructions used to describe those features.

As described above, file 35 is divided into enumerated blocks 36 and the bits in first bitmap 40 and second bitmap 45 are correlated to enumerated blocks 36. Correlating unit 57, shown in FIG. 9, may perform the division of file 35 or correlation between the bits in first bitmap 40 and second bitmap 45 and enumerated blocks 36. Both first bitmap 40 and second bitmap 45 may be managed by map management unit 60, which can set and reset the individual bits of first bitmap 40 and second bitmap 45. In particular, map management unit 60 may set a bit (e.g., turn on the bit or set its value to "1") or reset a bit (e.g., turn off a bit or reset its value to "0").

Thereafter, as long as first bitmap 40 contains elements (or bits) indicating that enumerated blocks 36 of the file are needed and have not yet been received, list building unit 65 builds a list of needed enumerated blocks 36, as determined by determining unit 75 when processing first bitmap 40. The list of needed blocks built by list building unit 65 may be represented, for example, as an explicit list of needed blocks (3, 19, 20, and 50) or using a compressed representation. For example, a 16-bit number indicating a particular enumerated block 36 number needed followed by a 16-bit bitmap where each of the 16 bits represent the sequentially numbered enumerated blocks, where each has been bit set or reset by map management unit 65, starting at the specified enumerated block 36 number where bit 0 would be set to the value "1" if the starting block is needed or else would be set to the value "0"; bit 1 would be set to value "1" if the next block (start+1) is needed or else it would be set to a value "0", etc. Those skilled in the art would recognize other variations of building a list are possible and will therefore not be discussed further herein.

Determining unit 75 also may determine, upon receipt of a transmission from another device (e.g., gateway device 10 or remote device 20), received via a receiver (e.g., radio transceiver 26 or radio transceiver 16), containing a list of needed blocks, whether storage unit 30 has the needed enumerated blocks 36 stored by reading first bitmap 40. If determining unit 75 determines that an enumerated block 36 needed by an adjacent device is stored locally, determining unit 75 may instruct map management unit 65 to mark the stored block as needing transmission by setting the appropriate element (or bit) in second bitmap 45 to a value "1".

In addition, determining unit 75 may periodically read second bitmap 45 and determine which of the enumerated blocks 36 stored in storage unit 30 (e.g., a corresponding bit in second bitmap 45 has a value of "1") to transmit (e.g., via radio transceiver 16 or radio transceiver 26). The transmission may include all data associated with the enumerated block 36 requested by the adjacent device and a block identifier to identify the position of the transmitted.

Furthermore, upon receipt of a transmission from an adjacent device (e.g., gateway device 10 or remote device 20) containing an enumerated block 36 (the enumerated block 36 received may or may not have been requested), determining unit 75 may determine whether the received enumerated block 36 has been stored (e.g., a corresponding bit in first bitmap 40 has a value of "1"). If determining unit 75 determines the received enumerated block 36 has not been stored, storing unit 70 may store the received enumerated block 36 in the appropriate block in file 35 (as determined, for example, by correlating unit 57) and the corresponding element (or bit) in bitmap 40 is set (e.g., set to a value of "1") to indicate the received enumerated block 36 is now stored and is no longer required.

In addition to the operations described above, processing unit 56 may be optimized to further enhance the file distribution operations described above. For example, processing unit 56 may determine (e.g., via determining unit 75) whether a bit is set in second bitmap 45 (indicating an enumerated block 36 is needed by an adjacent device) when an enumerated block has been received (e.g., by radio transceiver 26). Upon such a determination, processing unit 56 may clear (e.g., via map management unit 60) the corresponding bit in second bitmap 45 (as correlated by correlating unit 57), since the adjacent device that initially requested the enumerated block 36 corresponding to the set bit in second bitmap 45 may have also received the same transmission and so may no longer require the received enumerated block 36. If the enumerated block 36 was not received by the adjacent device, the adjacent device will send another request and the bit corresponding the missing enumerated block 36 will be set again in second bitmap 45, as described above.

In addition, in order to optimize utilization of the bandwidth available in wireless network 1, if a request is received from an adjacent device that is known not to be able to receive transmissions from this device (e.g., a list is built by list building unit 65); e.g., communications to the adjacent device are known to be uni-directional, processing unit 56 may not set (e.g., via map management unit 60) the requested enumerated block(s) for transmission in second bitmap 45. Similarly, if a request is received from an adjacent device that is not known to be able to receive transmissions from this device (e.g., a list is build by list building unit 65); e.g., communications are not known to be bi-directional), processing unit 56 may not set (e.g., via map management unit 60) the requested enumerated block(s) for transmission in second bitmap 45.

Furthermore, requests may include an indication of the number of enumerated blocks 36 remaining (or a percentage of the file not yet received) so that a priority may be assigned to completing file transfers for adjacent devices that are close to completion. Such a feature may be advantageous, for example, if the transferred file is software intended to improve the performance of wireless communications network 1 and thereby improve the transfers of that file to other devices operatively connected thereto (e.g., gateway device 10 or remote device 20).

Moreover, when processing unit selects block(s) from first bitmap 40 to transmit a request, processing unit 56 may select which block(s) to request at random. In so doing, if adjacent devices are requesting the same large set of blocks, the chances are improved that the transmitted requests will not become redundant. Similarly, when processing unit 56 select block(s) from second bitmap 45 to transmit, processing unit 56 selects among the enumerated blocks 36 blocks marked for transmission at random to reduce the chances of duplicate transmissions of the same enumerated block 36 and thereby improve the chances of transmission of multiple needed enumerated blocks 32.

Moreover, when gateway device 10 selects block(s) from second bitmap 45 to transmit, gateway device 10 does so in sequential order (e.g., round-robin). In so doing, gateway device 10 assures each block is transmitted. This optimization is particularly advantageous for gateway device 10 since gateway device 10 is often the original source of file 35 being distributed among devices (e.g., remote devices 20 and new device 20*a*) in wireless communication network 1. Accordingly, the requested enumerated blocks 36 may not be available from other devices (e.g., remote devices 20 and new device 20*a*) residing on wireless communications network 1.

Furthermore, when file 35 is first introduced to wireless communications network 1, file 35 is typically new to all of the remote devices (e.g., remote devices 20 and new device 20*a*). Consequently, all of the remote devices (e.g., remote devices 20 and new device 20*a*) need the same set of enumerated blocks 36. Accordingly, processing unit 56 may detect this by determining (via determining unit 75) that the parts of the same file 35 being requested are also being requested by adjacent devices (e.g., by receiving requests from those adjacent devices). Upon such a determination, processing unit 56 may enter "relay-mode" in which each newly received enumerated block 36 in first bitmap 40 is immediately entered into second bitmap 45 for transmission (even if a request for that enumerated block 36 has not yet been received).

Moreover, when new device 20*a* is introduced into wireless communications network 1, new device 20*a* may not contain file 35 that is already stored by all or most of the adjacent devices 20 to new device 20*a*. Consequently, new device 20*a* may request file 35 and may receive enumerated blocks 36 from adjacent devices (as shown in FIG. 4). Furthermore, new device 20*a* may not enter relay-mode unless new device 20*a* also hears requests for those same received enumerated blocks 36 from adjacent devices 20.

Figure 10C:
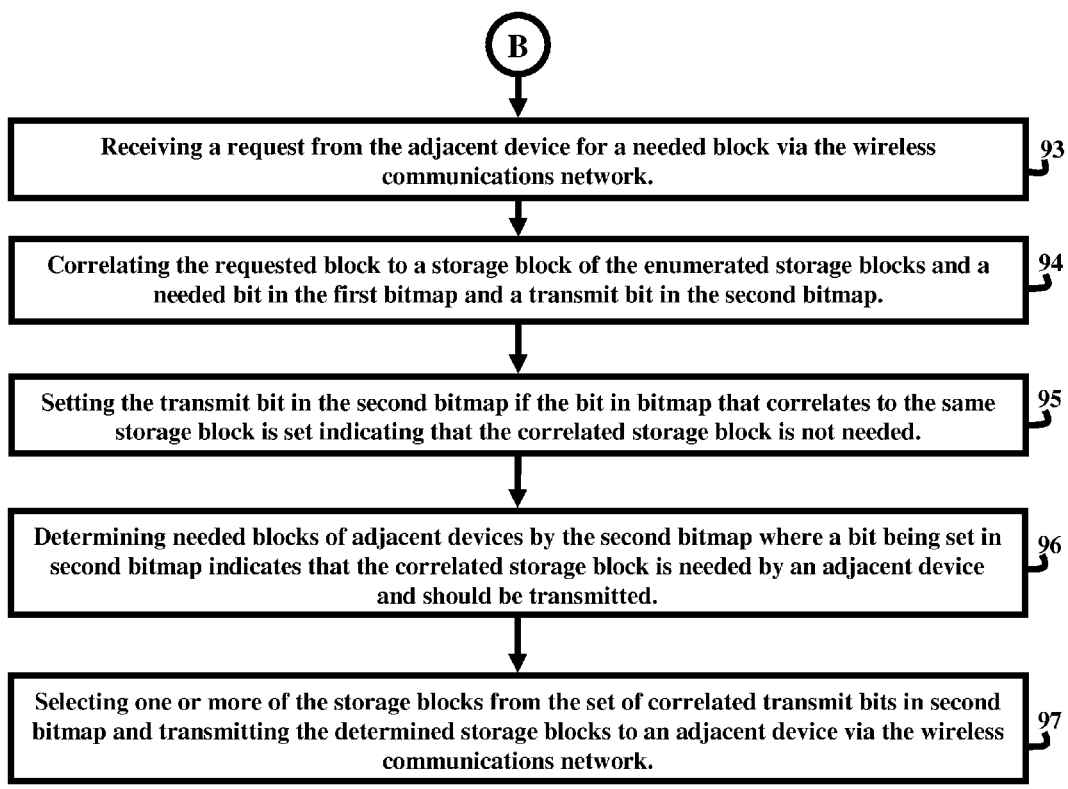

FIGS. 10(A) through 10(C), with reference to FIGS. 1 through 9, are flow diagrams illustrating a method according to the embodiments herein. At step 81, when the need for a new file is identified and the size of the new file is identified or is known a-priori, the method of FIG. 10(A), describes allocating storage sufficient to store the file 35 on a storage device (e.g., storage unit 30) coupled to a remote device (e.g., remote device 20). At step 82, the method of FIG. 10(A) describes dividing the allocated storage on the remote device 20 into enumerated storage blocks (e.g., enumerated blocks 36). Furthermore, at step 83, the method of FIG. 10(A) describes creating a first bitmap (e.g., first bitmap 40) of the allocated storage in a memory of the remote device 20, the first bitmap 40 comprising a plurality of first bits (e.g., first bits 41) with at least one first bit allocated for each allocated storage block 36 and each first bit 41 of the first bitmap 40 is initialized to indicate that every storage block 36 of the new file is needed (has not been received). Additionally, at step 84, the method of FIG. 10(A) describes correlating (e.g., correlating unit 57), by the remote device 20, each bit of the first bitmap 40 to a unique storage block of the plurality of enumerated storage blocks 36.

At step 85, the method of FIG. 10(A) describes creating a second bitmap (e.g. second bitmap 45) of the allocated storage in a memory of the remote device 20, the second bitmap 45 comprising a plurality of second bits (e.g., second bits 46) with at least one second bit allocated for each allocated storage block 36 and each second bit 46 of the second bitmap 45 is initialized to indicate that every storage block 36 of the new file does not need to be transmitted. Additionally, at step 86, the method of FIG. 10(A) describes correlating (e.g., correlating unit 57), by the remote device 20, each bit of the second bitmap 45 to a unique storage block of the plurality of enumerated storage blocks 36.

The method of FIG. 10(B) also describes receiving (e.g., radio transceiver 26), by the remote device 20, an enumerated transmission block from a wireless communications network (e.g., wireless communications network 1) at step 87. Step 88 of FIG. 10(B) describes correlating (e.g., correlating unit 57), by the remote device 20, the enumerated transmission block to a storage block of the enumerated storage blocks 36 and a bit in the first bitmap 40 and a bit in the second bitmap 45. Moreover, step 89 of FIG. 10(B) describes setting (e.g., map management unit 60), by the remote device 20, the received bit 41 in the first bitmap 40 to indicate that the correlated storage block has been received and is no longer needed. In addition, while not shown in FIG. 10(B), step 89 may also include setting (e.g., map management unit 60), by the remote device 20, the correlated transmit bit in the second bitmap 45 if the remote device 20 is in relay mode (described below), or clearing the transmit bit in the second bitmap 45 if the device 20 is not in relay mode. In addition, step 90 of FIG. 10(B) describes storing (e.g., storing unit 70) the enumerated transmission block in the correlated storage block. Furthermore, step 91 of FIG. 10(B) describes building a list of needed enumerated storage blocks from the first bitmap 40 (e.g., list building unit 65), where initialized bits 41 in the first bitmap 40 are included in the list of needed enumerated storage blocks. If more bits 41 in first bitmap 40 are initialized than will fit in the list of needed enumerated storage blocks, then the initialized bits 41 chosen for inclusion in the list are chosen at random from the set of initialized bits 41.

In step 92, the method of FIG. 10(B) describes transmitting (e.g., radio transceiver 26) a request to an adjacent device, via the wireless communications network 1, from the remote device 20, where the request includes the list of needed enumerated storage blocks. In step 93, the method of FIG. 10(C) receives (e.g., radio transceiver 26), by the remote device 20, a request from an adjacent device for a needed block via the wireless communications network 1. In step 94, the method of FIG. 10(C) correlates (e.g., correlating unit 57), by the remote device 20, the requested block to a storage block of the enumerated storage blocks and a needed bit 41 in the first bitmap 40 and a transmit bit 46 in the second bitmap 45.

In step 95, the method of FIG. 10(C) describes setting (e.g., map management unit 60), by the remote device 20, the transmit bit 46 in the second bitmap 45 if the bit 41 in bitmap 40 that correlates to the same storage block is set indicating that the correlated storage block is not needed (i.e., and is present and stored in storage block 36 and therefore available for transmission). Step 96 of FIG. 10(C) describes determining (e.g., determining unit 75), by the remote device 20, needed blocks of adjacent devices by using the second bitmap 45 where a bit 46 being set in second bitmap 45 indicates that the correlated storage block is needed by an adjacent device and should be transmitted. Step 97 of FIG. 10(C) also describes selecting one or more of the storage blocks 36 from the set of correlated transmit bits 46 in second bitmap 45 and transmitting (e.g., radio transceiver 26), by the remote device 20, the determined storage blocks 36 to an adjacent device via the wireless communications network 1.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may comprise hardware and software elements, wherein the embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein is depicted in FIG. 11. This schematic drawing illustrates a hardware configuration of an information handling/computer system in accordance with the embodiments herein. The system comprises at least one processor or central processing unit (CPU) 110. The CPUs 110 are interconnected via system bus 112 to various devices such as a random access memory (RAM) 114, read-only memory (ROM) 116, and an input/output (I/O) adapter 118. The I/O adapter 118 can connect to peripheral devices, such as disk units 111 and tape drives 113, or other program storage devices that are readable by the system. The system can read the inventive instructions on the program storage devices and follow these instructions to execute the methodology of the embodiments herein. The system further includes a user interface adapter 119 that connects a keyboard 115, mouse 117, speaker 124, microphone 122, and/or other user interface devices such as a touch screen device (not shown) to the bus 112 to gather user input. Additionally, a communication adapter 120 connects the bus 112 to a data processing network 125, and a display adapter 121 connects the bus 112 to a display device 123 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system of distributing a file through a wireless connection network comprising a plurality of devices interconnected in said wireless communications network, said plurality of devices comprising:
    at least one gateway device comprising:
        a gateway storage unit comprising a plurality of enumerated storage blocks that together form said file; and
        a gateway transmitter operatively connected to said wireless communications network, and transmitting said enumerated storage blocks from said gateway storage unit; and
    at least one remote device comprising:
        a remote device storage unit comprising:
            an allocated storage block sufficiently sized to store said file;
            a plurality of enumerated storage blocks that together form said allocated storage block; and
            a first bitmap comprising a plurality of stored bits, wherein every stored bit in said first bitmap is initially reset and is correlated to a unique enumerated storage block in said plurality of enumerated storage blocks;
        a remote device receiver operatively connected to said wireless communications network, and receiving an enumerated block;
        a remote device processing unit comprising:
            a correlating unit correlating said received enumerated block to a correlated enumerated storage block in said plurality of enumerated storage blocks and correlating an enumerated storage block with a correlated stored bit in said first bitmap;
            a map management unit setting said correlated stored bit in said first bitmap;
            a storing unit storing said received enumerated block to said correlated enumerated storage block;
            a list building unit building a list of missing blocks, and adding enumerated missing block identifiers to said list of missing blocks for correlated reset stored bits in said first bitmap; and
        a remote device transmitter operatively connected to said wireless communications network, and transmitting said list of missing blocks.

2. The system of claim 1, wherein said gateway storage unit comprises a second bitmap comprising a plurality of transmit bits, wherein every transmit bit in said second bitmap is initially reset and correlated to a unique enumerated storage block in said enumerated storage blocks, and said gateway device further comprises:
    a gateway receiver receiving a list of missing blocks from said remote device, wherein said list comprises identifiers for one or more enumerated blocks;
    a gateway processing unit comprising:
        a gateway correlating unit correlating the missing block identifiers to correlated enumerated storage blocks in said plurality of enumerated storage blocks and correlated transmit bits in said second bitmap; and
        a gateway map management unit setting said correlated transmit bits in said second bitmap,
    wherein said gateway device transmits, via said gateway transmitter, an enumerated storage block and enumerated storage block identifier for every correlated transmit bit set in said second bitmap.

3. The system of claim 2, wherein said gateway receiver receives an enumerated block and enumerated block identifier and said gateway correlating unit correlates said received enumerated block identifier to said correlated transmit bit in said second bitmap; and wherein said gateway map management unit resets said correlated transmit bit in said second bitmap.

4. The system of claim 2, wherein said gateway device selects and transmits enumerated storage blocks sequentially for every correlated transmit bit set in said second bitmap.

5. The system of claim 1, wherein said remote device storage unit comprises a second bitmap comprising a plurality of transmit bits, wherein every transmit bit in said second bitmap is initially reset and correlated to a unique enumerated storage block in said plurality of enumerated storage blocks, wherein said remote device receiver receives a request comprising a list of one or more missing block identifiers, wherein said remote device correlating unit correlates said requested missing block identifiers to a correlated enumerated storage block in said plurality of enumerated storage blocks and a correlated stored bit in said first bitmap and a correlated transmit bit in said second bitmap, wherein said map management unit sets said transmit bit in said second bitmap if said correlated stored bit in said first bitmap is set, and wherein said remote device transmits, via said remote device transmitter, a correlated enumerated storage block and enumerated storage block identifier for every transmit bit set in said second bitmap.

6. The system of claim 5, wherein said remote device enters a relay mode when said remote device receiver receives a request comprising one or more missing enumerated block identifiers, and wherein said requested enumerated block identifiers are correlated to said stored bits in said first bitmap, and when one or more stored bits in said first bitmap are reset.

7. The system of claim 1, further comprising a new remote device comprising:
a new remote device storage unit comprising:
a new remote device allocated storage block of sufficient size to store said file;
a plurality of new remote device enumerated storage blocks that together form said new remote device allocated storage block; and
a new remote device first bitmap comprising a plurality of new remote device stored bits, where every new remote device stored bit in said new remote device first bitmap is initially reset and correlated to a unique new remote device first enumerated storage block in said new remote device enumerated storage blocks;
a new remote device receiver operatively connected to said wireless communications network, and receiving an enumerated block and enumerated block identifier;
a new remote device processing unit comprising:
a new remote device correlating unit correlating said received enumerated block identifier to a new remote device correlated enumerated storage block in said plurality of new remote device enumerated storage blocks and a new remote device correlated stored bit in said new remote device first bitmap;
a new remote device map management unit setting said new remote device correlated stored bit in said new remote device first bitmap;
a new remote device storing unit storing said received enumerated block to said new remote device correlated enumerated storage block;
a new remote device list building unit building a new remote device list of missing enumerated block identifiers, and adding a new remote device enumerated missing block identifier to said new remote device list of missing block identifiers for every correlated reset stored bit in said new remote device first bitmap; and
a new remote device transmitter operatively connected to said wireless communications network, and transmitting said new remote device list of missing block identifiers.

8. The system of claim 7, wherein said new remote device storage unit comprises a new remote device second bitmap comprising a plurality of new remote device transmit bits, wherein every new remote device transmit bit in said new remote device second bitmap is initially reset and correlated to a unique new remote device enumerated storage block in said new remote device enumerated storage blocks, wherein said new remote device receiver receives a request comprising a list of one or more requested missing block identifiers, wherein said new remote device correlating unit correlates each requested enumerated block identifier in said requested list of enumerated block identifiers to a new remote device correlated enumerated storage block in said plurality of new remote device enumerated storage blocks and a correlated stored bit in said new remote device first bitmap and a correlated transmit bit in said new remote device second bitmap, wherein said new remote device map management unit sets said correlated transmit bit in said new remote device second bitmap if said correlated stored bit is also set in said new device first bitmap, and wherein said new remote device transmits, via said new remote device transmitter, an enumerated storage block for every correlated transmit bit set in said new remote device second bitmap.

9. The system of claim 8, wherein said new remote device selects and transmits enumerated storage blocks randomly from the set of correlated transmit bits in said new remote device second bitmap that are set.

10. The system of claim 8, wherein said new remote device enters a relay mode when said received enumerated block identifier request is correlated to a stored bit in said new device first bitmap and at least one bit of said new device first bitmap is reset.

11. The system of claim 10, wherein when said new remote device is in relay mode and when said new device receiver receives an enumerated block and said correlated stored bit in said new remote device first bitmap is reset, said new remote devices stores said received enumerated block in said correlated enumerated storage block in said plurality of enumerated storage blocks; and said new remote device sets said correlated stored bit in said new remote device first bitmap; and said new remote device sets said correlated transmit bit in said new remote device second bitmap.

12. The system of claim 8, wherein said new remote device receiver receives an enumerated block and enumerated block identifier and said new remote device correlating unit correlates said received enumerated block identifier to said correlated stored bit in said first bitmap; wherein said new remote device correlating unit correlates said received enumerated block identifier to said correlated transmit bit in said second bitmap, and wherein if said correlated stored bit in said first bitmap is already set, said new remote device map management unit resets said correlated transmit bit in said second bitmap.

13. An apparatus storing a file distributed across a wireless communications network connecting a plurality of adjacent devices, said apparatus comprising:
a receiver operatively connected to said wireless communications network, and receiving an enumerated storage block and a request from an adjacent device, wherein said request comprises a requested block;
a storage unit comprising:
an allocated storage block sufficient sized to store said file;
a plurality of enumerated storage blocks that together form said allocated storage block;
a first bitmap comprising a plurality of stored bits, wherein every stored bit in said first bitmap is initially reset and is correlated to a unique enumerated storage block in said plurality of enumerated storage blocks; and
a second bitmap comprising a plurality of transmit bits, wherein every transmit bit in said second bitmap is initially reset and correlated to a unique enumerated storage block in said plurality of enumerated storage blocks;

a processing unit wherein said processing unit:

correlates said received enumerated storage block to a correlated enumerated storage block in said plurality of enumerated storage blocks and a correlated stored bit in said first bitmap, sets said correlated stored bit in said first bitmap, stores said received enumerated storage block to said correlated enumerated storage block, builds a list of missing blocks and adds an enumerated missing block identifier to said list of missing blocks for every reset stored bit in said first bitmap, correlates said requested block to a correlated storage block in said plurality of enumerated storage blocks and a requested block transmit bit in said second bitmap, sets said requested block transmit bit in said second bitmap, and selects an enumerated requested block from said second bitmap; and a transmitter operatively connected to said wireless communications network, and transmitting said list of missing blocks and said enumerated requested block.

14. The apparatus of claim 13, wherein said processing unit correlates said received enumerated block to a correlated enumerated block transmit bit in said second bitmap; correlates said received enumerated block to a correlated enumerated block stored bit in said first bitmap; and resets said correlated enumerated block transmit bit in said second bitmap when said correlated enumerated block stored bit in said first bitmap is set prior to reception of said enumerated block.

15. The apparatus of claim 13, wherein said processing unit builds a list of uni-directional adjacent device identifiers, wherein an adjacent device comprises a device which said apparatus directly communicates with via wireless communication without the communication being relayed by other devices; and wherein said processing unit:

determines whether an adjacent device is operatively connected to said wireless communications network via a uni-directional communications link; and adds a uni-directional adjacent device identifier to said list of uni-directional adjacent devices when determined said adjacent device is operatively connected to said wireless communications network via said uni-directional communications link.

16. The apparatus of claim 15, wherein said processing unit determines whether said requested block is received from a requesting uni-directional adjacent device identified in said list of uni-directional adjacent device identifiers; and does not set said requested block transmit bit in said second bitmap when determining said requested block is received from a requesting uni-directional adjacent device identified in said list of uni-directional adjacent device identifiers.

17. The apparatus of claim 13, wherein said processing unit randomly selects one or more random missing enumerated blocks to request from said adjacent devices from the group of stored bits in said first bitmap that are reset, wherein said processing unit builds a list of said missing enumerated block identifiers, and wherein said transmitter transmits said list of missing enumerated block identifiers.

18. The apparatus of claim 13, wherein said processing unit randomly selects a correlated enumerated storage block to transmit to said adjacent devices from among said group of correlated transmit bits in said second bitmap, and wherein said transmitter transmits said random enumerated storage block.

19. The apparatus of claim 13, wherein said received request comprises a priority value, and wherein said processing unit assigns said priority value to each requested block in said list of requested blocks according to said received priority value.

20. The apparatus of claim 18, wherein said transmitter transmits each requested block in said list of requested blocks sequentially in order of said assigned priority value.

21. The apparatus of claim 13, wherein said processing unit builds a list of bi-directional adjacent device identifiers; determines whether an adjacent device is operatively connected to said wireless communications network via a bi-directional communications link; and adds a bi-directional adjacent device identifier to said list of bi-directional adjacent device identifiers when determined said adjacent device is operatively connected to said wireless communications network via said bi-directional communications link.

22. The apparatus of claim 21, wherein said processing unit determines said requested block is received from a requesting adjacent device and said adjacent device is not identified in said list of bi-directional adjacent device identifiers; and does not set said correlated transmit bit in said second bitmap.

23. The apparatus of claim 13, wherein said transmitter transmits each enumerated requested block from said second bitmap in the order in which said enumerated block requests were received.

24. A computer-implemented method of distributing a file to a plurality of devices, comprising at least one remote device and at least one adjacent device, through a wireless communications network, said method comprising:

allocating storage sufficient to store said file on a storage device coupled to said remote device;

dividing said allocated storage on said remote device into enumerated storage blocks;

creating a first bitmap of said allocated storage in a memory of said remote device, said first bitmap comprising a plurality of stored bits and each stored bit of said first bitmap is reset;

correlating, by said remote device, each stored bit of said first bitmap to a unique storage block of said plurality of enumerated storage blocks;

receiving, by said remote device, an enumerated transmission block from said wireless communications network;

correlating, by said remote device, said enumerated transmission block to a block of said enumerated storage blocks and a stored bit in said first bitmap;

setting, by said remote device, said stored bit in said first bitmap;

storing said enumerated transmission block in said enumerated storage block;

building a list of needed enumerated storage blocks from said first bitmap, wherein every reset stored bit in said first bitmap is included in said list of needed enumerated storage blocks;

transmitting a request to said adjacent device, via said wireless communications network, from said remote device, where said request includes said list of needed enumerated storage blocks;

creating a second bitmap of said allocated storage in said memory of said remote device, where said second bitmap comprises a plurality of transmit bits and each transmit bit of said second bitmap is reset;

correlating, by said remote device, each transmit bit of said second bitmap to a unique block of said enumerated storage blocks;

receiving, by said remote device, a request from said adjacent device for a needed block via said wireless communications network;

correlating, by said remote device, said needed block to a block of said enumerated storage blocks and a stored bit in said first bitmap and a transmit bit in said second bitmap;

setting, by said remote device, said transmit bit in said second bitmap;

determining, by said remote device, needed blocks of said adjacent devices from the set transmit bits in said second bitmap; and transmitting, by said remote device, said determined needed blocks to said adjacent device via said wireless communications network.

* * * * *